(12) United States Patent
Murata (10) Patent No.: US 10,974,549 B2
(45) Date of Patent: Apr. 13, 2021

(54) PNEUMATIC TIRE

(71) Applicant: Sumitomo Rubber Industries, Ltd., Kobe (JP)

(72) Inventor: Takehiko Murata, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 373 days.

(21) Appl. No.: 15/808,564

(22) Filed: Nov. 9, 2017

(65) Prior Publication Data

US 2018/0141387 A1    May 24, 2018

(30) Foreign Application Priority Data

Nov. 22, 2016   (JP) .............................. JP2016-227069

(51) Int. Cl.
*B60C 11/11*  (2006.01)
*B60C 11/03*  (2006.01)
*B60C 11/12*  (2006.01)

(52) U.S. Cl.
CPC .......... *B60C 11/11* (2013.01); *B60C 11/0304* (2013.01); *B60C 2011/036* (2013.01); *B60C 2011/0346* (2013.01); *B60C 2011/0353* (2013.01); *B60C 2011/0365* (2013.01); *B60C 2011/0381* (2013.01); *B60C 2011/1209* (2013.01); *B60C 2200/14* (2013.01)

(58) Field of Classification Search
CPC ............. B60C 11/11; B60C 2011/0346; B60C 2011/0353; B60C 2011/0381; B60C 11/0304; B60C 11/0306; B60C 11/0311; B60C 2011/0344

USPC ................................ 152/902, 209.9, 209.18
See application file for complete search history.

(56) References Cited

U.S. PATENT DOCUMENTS

| | | | | |
|---|---|---|---|---|
| 4,785,861 A * | 11/1988 | Fujiwara | ................... | B60C 3/04 152/209.14 |
| 5,000,239 A * | 3/1991 | Brayer | ................ | B60C 11/0083 152/209.14 |
| 5,109,904 A * | 5/1992 | Numata | ................... | B60C 11/11 152/209.22 |
| 5,343,918 A * | 9/1994 | Fontaine | ............. | B60C 11/0306 152/209.5 |
| 5,658,404 A * | 8/1997 | Brown | ................ | B60C 11/0309 152/209.8 |
| 2012/0000586 A1 | 1/2012 | Kami | | |
| 2015/0273949 A1* | 10/2015 | Arai | .................... | B60C 11/0316 152/209.18 |

(Continued)

FOREIGN PATENT DOCUMENTS

JP          2012-11981 A     1/2012

*Primary Examiner* — Robert C Dye
*Assistant Examiner* — Edgaredmanuel Troche
(74) *Attorney, Agent, or Firm* — Birch, Stewart, Kolasch & Birch, LLP (57) ABSTRACT

A pneumatic tire 1 comprises a tread portion 2 provided with main grooves 3 extending zigzag continuously in the tire circumferential direction, and lateral grooves 4 extending in the tire axial direction. The main grooves 3 include a pair of shoulder main grooves 6. The lateral grooves 4 include shoulder lateral grooves 17 extending from the shoulder main grooves 6 to tread edges Te. The maximum groove width W8 of the shoulder lateral grooves 17 is 0.2 to 0.6 times the maximum groove width W1 of the shoulder main grooves 6.

19 Claims, 4 Drawing Sheets

(56) References Cited

U.S. PATENT DOCUMENTS

2016/0089939 A1* 3/2016 Oji .......................... B60C 5/12
                                                    152/209.18
2016/0243898 A1* 8/2016 Ito ....................... B60C 11/0327

* cited by examiner

PNEUMATIC TIRE

TECHNICAL FIELD

The present invention relates to a pneumatic tire improved in on-road performance, off-road performance, ride comfort performance and noise performance in a well congruous manner.

BACKGROUND ART

Pneumatic tires for vehicles such as sport-utility vehicle and four-wheel drive vehicle used in rough terrain as well as on surfaced streets are required to satisfy both of on-road performance and off-road performance. The on-road performance during running on surfaced streets includes wet performance and dry performance. The off-road performance during running in rough terrain includes mud performance and snow performance.

In recent years, such pneumatic tires are further required to satisfy ride comfort performance and noise performance during running on surfaced streets. Therefore, such required performances need to be improved totally, namely, in a well congruous manner.

Japanese Patent Application Publication No. 2012-011981A (Patent document 1) discloses a pneumatic tire directed to improve mud performance without sacrificing noise performance and steering stability (or dry performance).

SUMMARY OF THE INVENTION

The pneumatic tire disclosed in Patent document 1, however, has room for improvement in the wet performance, snow performance and ride comfort performance when assessed together with the dry performance, mud performance and noise performance.

It is therefore, an object of the present invention to provide a pneumatic tire in which on-road performance, off-road performance, ride comfort performance and noise performance are improved totally in a congruous manner.

According to the present invention, a pneumatic tire comprises:

a tread portion having tread edges and provided with a plurality of main grooves extending zigzag continuously in the tire circumferential direction, and a plurality of lateral grooves extending in the tire axial direction, the main grooves including a pair of shoulder main grooves disposed one on each side of the tire equator and having a maximum groove width, the lateral grooves including a plurality of shoulder lateral grooves extending axially outwardly from the shoulder main grooves to the tread edges and having a maximum groove, wherein the maximum groove width of the shoulder lateral grooves is 0.2 to 0.6 times the maximum groove width of the shoulder main grooves.

Therefore, in the pneumatic tire according to the present invention, by the shoulder main grooves and the shoulder lateral grooves, wet performance, mud performance and snow performance can be improved. Further, by the maximum groove width of the shoulder lateral grooves decreased to the range from 0.2 to 0.6 times the maximum groove width of the shoulder main grooves, the land ratio in tread shoulder regions is increased and dry performance and noise performance can be improved. Furthermore, as the arrangement of the shoulder main grooves and the shoulder lateral grooves is well balanced, ride comfort performance can be improved. Thus, the on-road performance including wet performance and dry performance, the off-road performance including mud performance and snow performance, ride comfort performance and noise performance can be improved in a well congruous manner.

Further, the pneumatic tire according to the present invention may have the following features (1)-(9):

(1) the main grooves include a single crown main groove disposed between the shoulder main grooves, and
a zigzag amplitude in the tire axial direction of the crown main groove is greater than a zigzag amplitude in the tire axial direction of each of the shoulder main grooves;

(2) zigzag pitches in the tire circumferential direction of the crown main groove are equal to zigzag pitches in the tire circumferential direction of each of the shoulder main grooves;

(3) axially outermost points of the crown main groove on both sides in the tire axial direction are respectively connected with axially innermost points of the shoulder main grooves;

(4) the crown main groove is composed of alternate first crown main groove oblique segments and second crown main groove oblique segments, wherein, toward one tire circumferential direction, the first crown main groove oblique segments are inclined with respect to the tire circumferential direction to one tire axial direction, whereas the second crown main groove oblique segments are inclined with respect to the tire circumferential direction to the other tire axial direction, and
a groove width of the first crown main groove oblique segments and a groove width of the second crown main groove oblique segments are less than the minimum groove width of the shoulder main grooves;

(5) the crown main groove is composed of alternate first crown main groove oblique segments and second crown main groove oblique segments, wherein, toward one tire circumferential direction, the first crown main groove oblique segments are inclined with respect to the tire circumferential direction to one tire axial direction, whereas the second crown main groove oblique segments are inclined with respect to the tire circumferential direction to the other tire axial direction, and
each of the first crown main groove oblique segments is connected with a pair of short grooves extending axially outwardly toward the respective shoulder main grooves and terminating without reaching the shoulder main grooves;

(6) the short grooves are inclined in the same direction as the second crown main groove oblique segments;

(7) a maximum groove width of each of the short grooves is 0.6 to 1.4 times the groove width of the first crown main groove oblique segment, and
a maximum length of each of the short groove is 0.8 to 2.0 times the groove width of the first crown main groove oblique segment;

(8) each of the shoulder lateral grooves is composed of an axially inner straight shoulder lateral groove segment, an axially outer straight shoulder lateral groove segment, and an in-between crank shoulder lateral groove segment connecting therebetween and having an acute angled portion;

(9) the tread portion is further provided with narrow grooves each extending in the tire circumferential direction from the in-between crank shoulder lateral groove segment of one of the shoulder lateral grooves to the axially inner straight shoulder lateral groove segment of the adjacent shoulder lateral groove.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

In case of passenger car tires, however, the standard pressure and standard tire load are uniformly defined by 180 kPa and 88% of the maximum tire load, respectively.

The tread edges Te are the axial outermost edges of the ground contacting patch of the tire which occurs under the normally inflated loaded condition when the camber angle of the tire is zero.

The tread width Wt is the width measured under the normally inflated unloaded condition, as the axial distance between the tread edges Te determined as above.

DESCRIPTION OF THE PREFERRED EMBODIMENTS

Embodiments of the present invention will now be described in detail in conjunction with the accompanying drawings.

According to the present invention, pneumatic tire 1 comprises a tread portion 2 whose radially outer surface defines the tread, a pair of axially spaced bead portions mounted on rim seats, a pair of sidewall portions extending between the tread edges and the bead portions, a carcass extending between the bead portions through the tread portion and the sidewall portions, and a tread reinforcing belt disposed radially outside the carcass in the tread portion as well known in the art.

Figure 1:
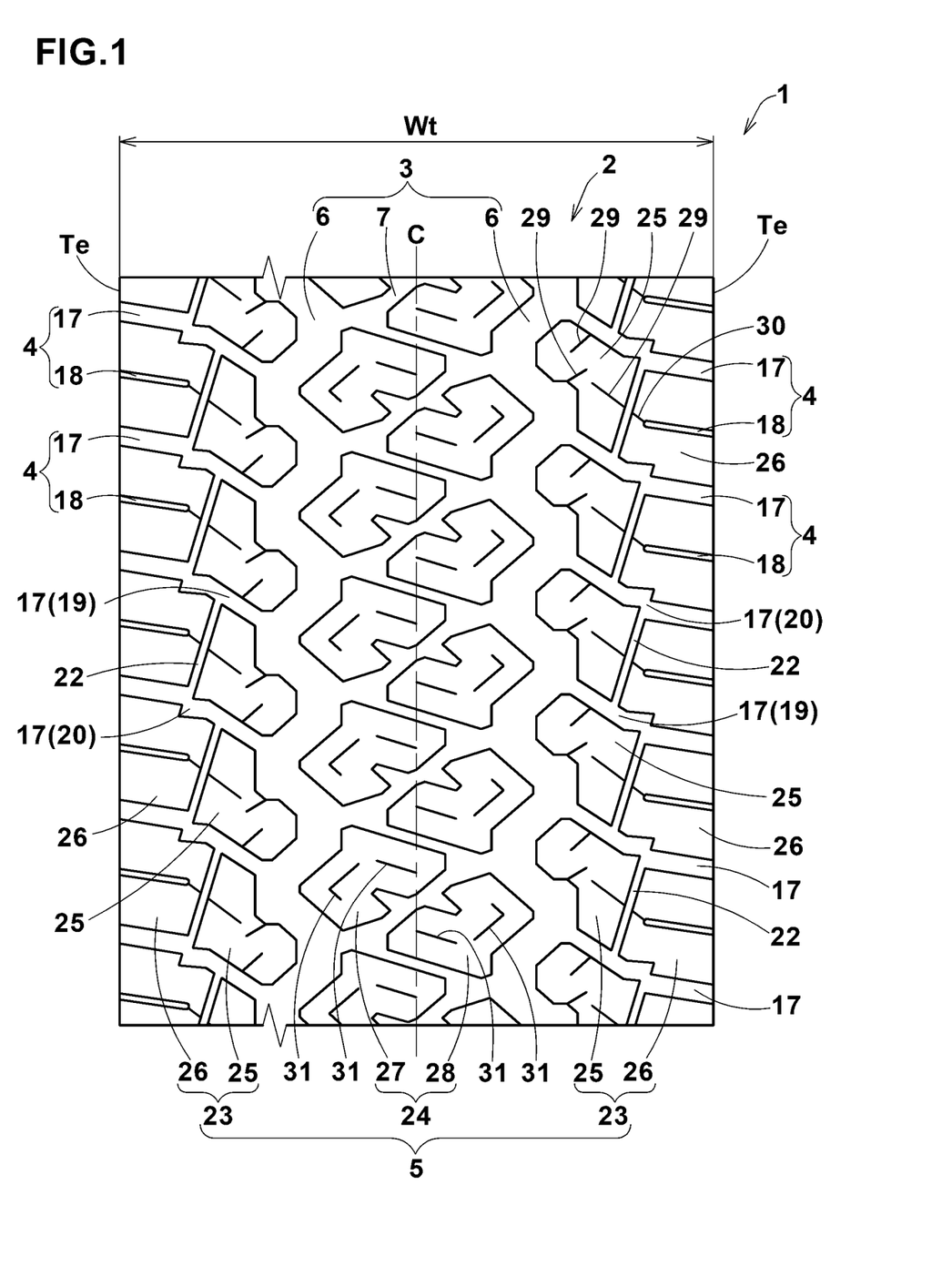
FIG. 1 is a developed partial view of the tread portion of a pneumatic tire as an embodiment of the present invention.

As shown in FIG. 1, the tread portion 2 is provided with
a plurality of main grooves 3 extending zigzag and continuously in the tire circumferential direction, and
a plurality of lateral grooves 4 extending in the tire axial direction.

The tread portion 2 is preferably provided with a plurality of blocks 5 divided by the main grooves 3 and the lateral grooves 4.

The main grooves 3 include a pair of shoulder main grooves 6 disposed one on each side of the tire equator C, and a single crown main groove 7 disposed therebetween.

It is preferable that the crown main groove 7 extends alternately across the tire equator C.

Figure 2:
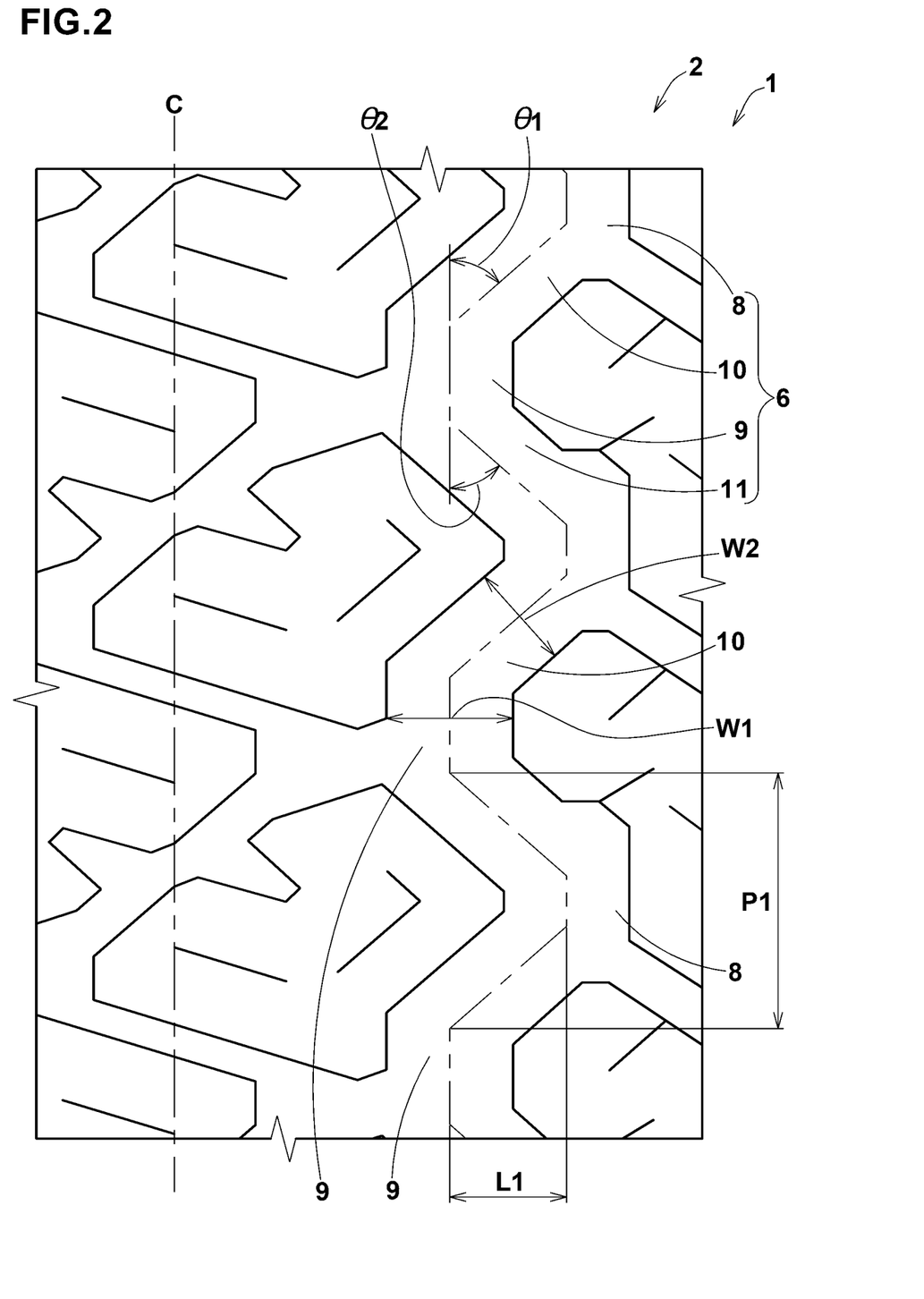
FIG. 2 is an enlarged partial view of the tread portion showing a part of the shoulder main groove.

In the present embodiment, as shown in FIG. 2, each of the shoulder main grooves 6 comprises
axially outer shoulder main groove segments 8 respectively located at axially outermost positions of the shoulder main groove 6, and
axially inner shoulder main groove segments 9 respectively located at axially innermost positions of the shoulder main groove 6.

It is preferable that the axially outer shoulder main groove segments 8 and the axially inner shoulder main groove segments 9 are disposed alternately in the tire circumferential direction.

The axially outer shoulder main groove segments 8 and the axially inner shoulder main groove segments 9 extend straight in parallel with the tire circumferential direction.

The axially outer shoulder main groove segments 8 and the axially inner shoulder main groove segments 9 in the present embodiment have substantially same groove widths.

The maximum groove width W1 of each of the shoulder main grooves 6 is preferably the same as the groove width of the axially outer shoulder main groove segments 8 or the axially inner shoulder main groove segments 9.

When the groove width of the axially outer shoulder main groove segments 8 is different from the groove width of the axially inner shoulder main groove segments 9, the larger groove width is used as the maximum groove width W1.

The maximum groove width W1 is preferably in a range from 7% to 10% of the tread width Wt.

The tire 1 provided with such shoulder main grooves 6 can be improved in the wet performance, the mud performance and the snow performance owing to the wide axially outer shoulder main groove segments 8 and axially inner shoulder main groove segments 9.

Each of the shoulder main grooves 6 in the present embodiment further comprises
first oblique shoulder main groove segments 10 inclined with respect to the tire circumferential direction to one tire axial direction at a first angle θ1, and
second oblique shoulder main groove segments 11 inclined with respect to the tire circumferential direction to the other tire axial direction at a second angle θ2.

The first oblique shoulder main groove segments 10 and the second oblique shoulder main groove segments 11 connect between the axially outer shoulder main groove segments 8 and the axially inner shoulder main groove segments 9, therefore, the shoulder main groove 6 extends zigzag in a trapezoidal wave form.

It is preferable that the first oblique shoulder main groove segments 10 and the second oblique shoulder main groove segments 11 each extend straight.

The first angle θ1 of the first oblique shoulder main groove segments 10 is preferably 30 to 70 degrees. The second angle θ2 of the second oblique shoulder main groove segments 11 is preferably 30 to 70 degrees.

In the present embodiment, the first angle θ1 is substantially the same as the second angle θ2.

In the present embodiment, the groove width of the first oblique shoulder main groove segments 10 is substantially the same as the groove width of the second oblique shoulder main groove segments 11.

It is preferable that the minimum groove width W2 of each of the shoulder main grooves 6 is the groove width of the first oblique shoulder main groove segments 10 or the groove width of the second oblique shoulder main groove segments 11. The minimum groove width W2 is preferably set in a range from 5% to 8% of the tread width Wt.

When the groove width of the first oblique shoulder main groove segments 10 is different from the groove width of the second oblique shoulder main groove segments 11, the smaller groove width is used as the minimum groove width W2.

Such first oblique shoulder main groove segments 10 and second oblique shoulder main groove segments 11 expedite water flow in the shoulder main groove 6 and discharge of mud and snow.

The zigzag amplitude L1 in the tire axial direction of the shoulder main groove 6 is preferably set in a range from 5% to 9% of the tread width Wt.

As shown in FIG. 2, the zigzag amplitude L1 is the distance measured in the tire axial direction between the groove center line of the axially outer shoulder main groove segment 8 and the groove center line of the axially inner shoulder main groove segment 9.

In the present embodiment, the zigzag amplitude L1 of the shoulder main groove 6 is less than the maximum groove width W1 of the shoulder main groove 6.

Such shoulder main grooves 6 can improve on-road performance and off-road performance in good balance.

Preferably, the zigzag pitches P1 in the tire circumferential direction of each of the shoulder main grooves 6 are set in a range from 2.0 to 3.5 times the zigzag amplitude L1 of the shoulder main groove 6.

Here, one zigzag pitch P1 is the distance measured in the tire circumferential direction between two corresponding points on circumferentially adjacent two of the circumferentially repeated unit patterns of the shoulder main groove 6.

The zigzag pitches P1 may be constant or variable in the tire circumferential direction.

Figure 3:
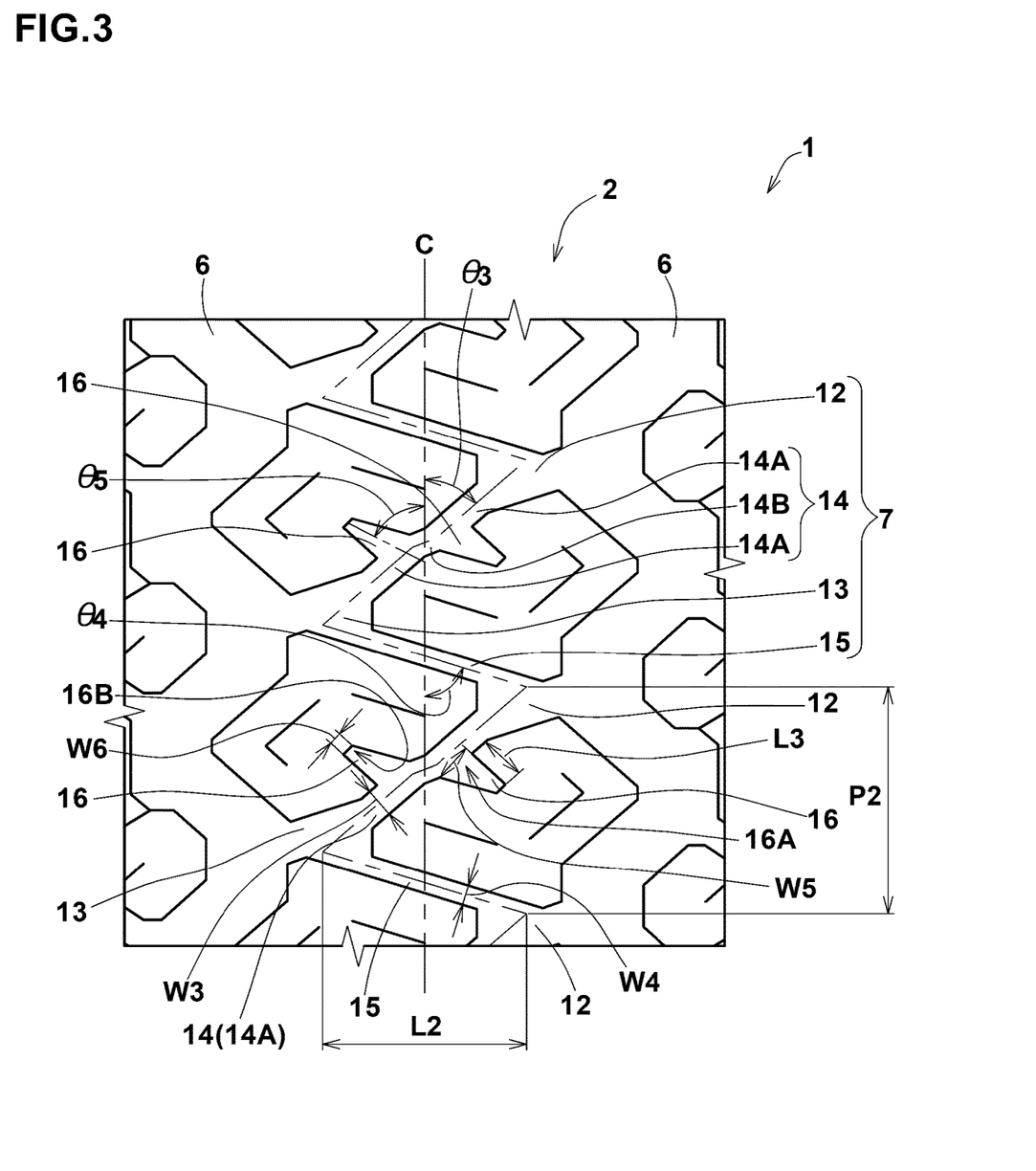
FIG. 3 is an enlarged partial view of the tread portion showing a part of the crown main groove.

The crown main groove 7 in the present embodiment has first crown main groove outermost parts 12 located at axially outermost positions on one side of the tire equator, and second crown main groove outermost parts 13 located at axially outermost positions on the other side of the tire equator as shown in FIG. 3.

It is preferable that the first crown main groove outermost parts 12 and the second crown main groove outermost parts 13 are disposed alternately in the tire circumferential direction.

The crown main groove 7 in the present embodiment is composed of first oblique crown main groove segments 14 and second oblique crown main groove segments 15.

The first oblique crown main groove segments 14 are inclined with respect to the tire circumferential direction to one tire axial direction toward one tire circumferential direction, whereas the second oblique crown main groove segments 15 are inclined with respect to the tire circumferential direction to the other tire axial direction.

The first oblique crown main groove segments 14 and the second oblique crown main groove segments 15 connect between the first crown main groove outermost parts 12 and the second crown main groove outermost parts 13. Thereby, the crown main groove 7 extends zigzag.

It is preferable that each of the first oblique crown main groove segments 14 is composed of a pair of first oblique crown main groove segment main portions 14A having respective center lines each extending straight and shifted from each other in the groove widthwise direction, and a first oblique crown main groove segment crank portion 14B connecting between the first oblique crown main groove segment main portions 14A.

It is preferable that the first oblique crown main groove segment main portions 14A extend substantially parallel with each other at a third angle θ3 with respect to the tire circumferential direction.

Preferably, the third angle θ3 is set in a range from 30 to 70 degrees.

It is preferable that the second oblique crown main groove segments 15 each extend straight at a fourth angle θ4 with respect to the tire circumferential direction.

Preferably, the fourth angle θ4 is set in a range from 65 to 85 degrees.

In the present embodiment, the fourth angle θ4 is greater than the third angle θ3.

Since the crown main groove 7 provided with such first oblique crown main groove segments 14 and second oblique crown main groove segments 15 is increased in the axial groove component to exert high traction performance on muddy roads and compacted snow roads, and the off-road performance of the tire 1 can be improved.

In the present embodiment, the groove width W3 of the first oblique crown main groove segment main portion 14A is less than the minimum groove width W2 of the shoulder main groove 6. The groove width W3 is preferably set in a range from 2% to 5% of the tread width Wt.

It is preferable that the first oblique crown main groove segment main portion 14A is increased in the groove width W3 at the connected position with the first crown main groove outermost part 12 or second crown main groove outermost part 13.

In the present embodiment, the groove width W4 of the second oblique crown main groove segments 15 is less than the minimum groove width W2 of the shoulder main grooves 6.

It is preferable that the groove width W4 is less than the groove width W3 of the first oblique crown main groove segments 14.

The groove width W4 is preferably set in a range from 1% to 4% of the tread width Wt.

The crown main groove 7 provided with such first oblique crown main groove segments 14 and second oblique crown main groove segments 15 increases the land ratio in a tread crown region, and the dry performance and the noise performance of the tire 1 can be improved.

Further, the first oblique crown main groove segments 14 increased in the width at the connected positions with the first crown main groove outermost part 12 and second crown main groove outermost part 13 can improve the discharge of mud and snow.

Preferably, the zigzag amplitude in the tire axial direction L2 of the crown main groove 7 is set in a range from 15% to 23% of the tread width Wt.

The zigzag amplitude L2 is the distance in the tire axial direction between the outermost point of the groove center line in the first crown main groove outermost parts 12 and the outermost point of the groove center line in the second crown main groove outermost parts 13 of the crown main groove 7.

It is preferable that the zigzag amplitude L2 of the crown main groove 7 is greater than the zigzag amplitude L1 of each of the shoulder main grooves 6.

Such crown main groove 7 is increased in the axial groove component to exert high traction performance on muddy roads and compacted snow roads, and the off-road performance of the tire 1 can be improved.

The zigzag pitches P2 in the tire circumferential direction of the crown main groove 7 are preferably set in a range from 0.9 to 1.3 times the zigzag amplitude L2 of the crown main groove 7.

Here, one zigzag pitch P2 is the distance measured in the tire circumferential direction between two corresponding points on circumferentially adjacent two of the circumferentially repeated unit patterns of the crown main groove 7.

It is preferable that the zigzag pitches P2 are substantially the same as the zigzag pitches P1 of the shoulder main grooves 6.

The zigzag pitches P2 may be substantially constant or variable in the tire circumferential direction.

If the zigzag pitches P2 of the crown main groove 7 are variable, it is preferable that the zigzag pitches P1 of the shoulder main grooves 6 are also variable. In this case, it is preferable that the variation of the zigzag pitches P2 in the tire circumferential direction is substantially the same as the variation of the zigzag pitches P1 in the tire circumferential direction.

In the present embodiment, each of the first oblique crown main groove segments 14 is connected with a pair of short grooves 16 extending axially outwardly toward the respective shoulder main grooves 6 and terminating without reaching thereto. It is preferable that the short grooves 16 extend from the respective first oblique crown main groove segment main portions 14A so as not to intersect the tire equator C.

In the present embodiment, the center lines of the short grooves 16 are shifted from each other in the groove widthwise direction. such short grooves 16 increase snow grip, and snow performance can be improved.

Further, the paired short grooves 16 shifted from each other are advantageous to noise performance and ride comfort performance during running on surfaced streets.

It is preferable that the short grooves 16 are inclined in the same direction as the second oblique crown main groove segments 15 at a fifth angle θ5 with respect to the tire circumferential direction.

Preferably, the fifth angle θ5 is set in a range from 40 to 80 degrees.

The short grooves 16 in this example each have
a maximum groove width W5 at its opening 16A to the first oblique crown main groove segment 14 and
a minimum groove width W6 at its closed end 16B farthest from the first oblique crown main groove segment 14.

Preferably, the maximum groove width W5 is set in a range from 0.6 to 1.4 times the groove width W3 of the first oblique crown main groove segment main portion 14A.

The minimum groove width W6 is preferably set in a range from 0.2 to 0.8 times the groove width W3.

Preferably, the maximum length L3 of the short groove 16 is set in a range from 0.8 to 2.0 times the groove width W3 of the first oblique crown main groove segment main portion 14A. Here, the maximum length L3 is the length measured from the opening 16A to the closed end 16B of the short groove 16.

The short grooves 16 having such dimensions can optimize the rigidity of the tread crown region, and the ride comfort performance of the tire 1 can be improved.

It is preferable that the first crown main groove outermost parts 12 and the second crown main groove outermost parts 13 are connected with the axially inner shoulder main groove segments 9 of the respective shoulder main grooves 6 as shown in FIGS. 1-3.

Such arrangement of the crown main groove 7 and the shoulder main grooves 6 does not need lateral grooves connecting therebetween, and the zigzag amplitude L1 of the shoulder main grooves and the zigzag amplitude L2 of the crown main groove 7 can be increased. And the off-road performance of the tire 1 can be improved.

In the present embodiment, as shown in FIG. 1, the above-mentioned lateral grooves 4 include a plurality of shoulder lateral grooves 17 and a plurality of shoulder lug grooves 18.

The shoulder lateral grooves 17 extend axially outwardly from the shoulder main grooves 6 to the tread edges Te.

The shoulder lug grooves 18 extend axially inwardly from the tread edges Te and terminate without reaching the shoulder main grooves 6 so as to have axially inner ends 18A.

It is preferable that the shoulder lateral grooves 17 and the shoulder lug grooves 18 are disposed alternately in the tire circumferential direction.

Figure 4:
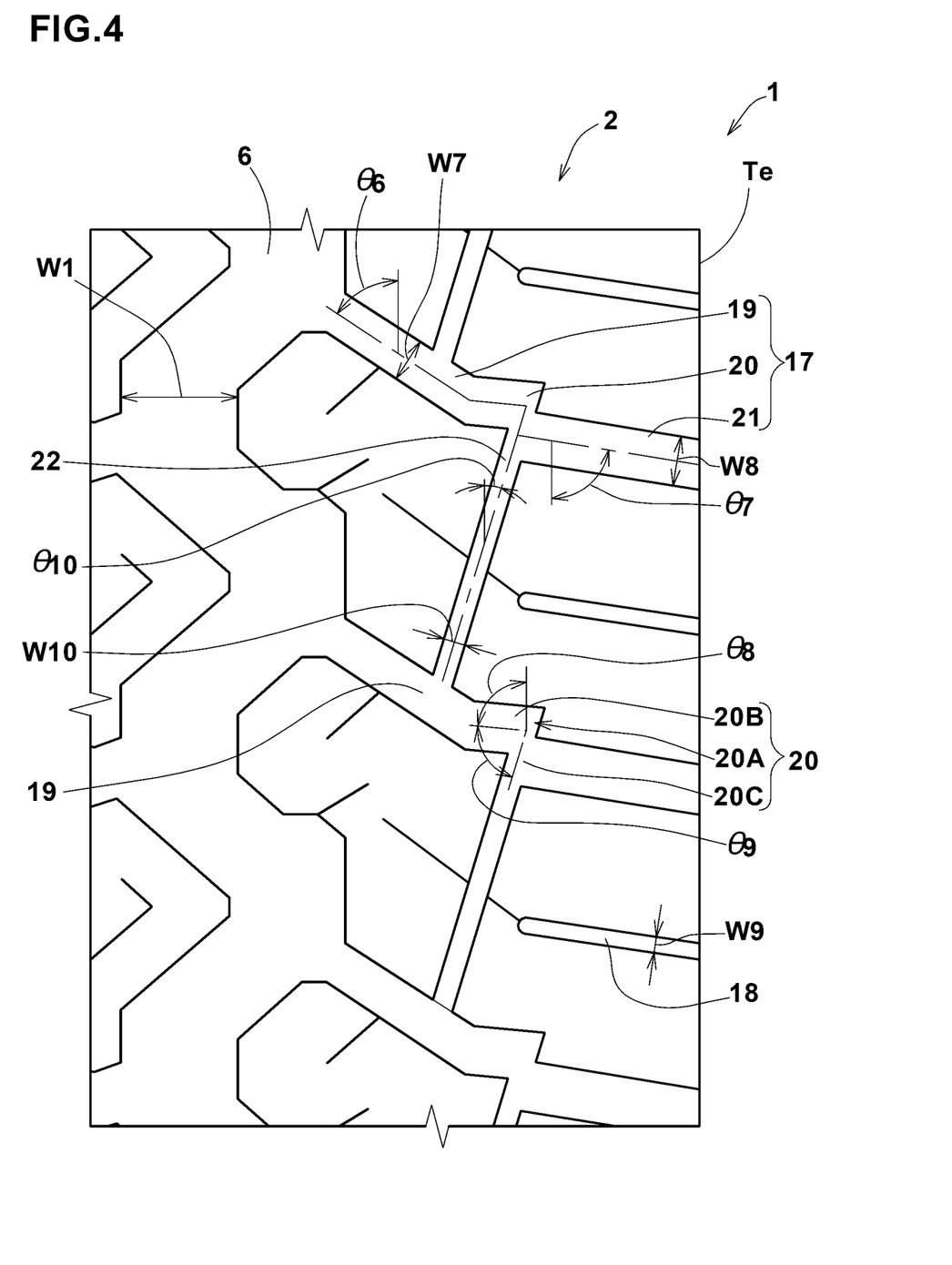
FIG. 4 is an enlarged partial view of the tread portion showing the shoulder lateral grooves.

The shoulder lateral groove 17 is composed of an axially inner straight shoulder lateral groove segment 19, an axially outer straight shoulder lateral groove segment 21, and a in-between crank shoulder lateral groove segment 20 therebetween, It is preferable that, as shown in FIG. 4, the in-between crank shoulder lateral groove segment 20 has an acute angled portion 20A and connects between the axially inner straight shoulder lateral groove segment 19 and the axially outer straight shoulder lateral groove segment 21.

It is preferable that the shoulder lateral groove 17 is formed as a bent groove in a crank shape as a whole. Such shoulder lateral grooves 17 can improve the noise performance of the tire 1.

The axially inner straight shoulder lateral groove segment 19 has an axially inner end opened to the shoulder main groove 6.

It is preferable that the axially inner straight shoulder lateral groove segment 19 is inclined in the same direction as the second oblique crown main groove segments 15 at a sixth angle θ6 with respect to the tire circumferential direction. Preferably, the sixth angle θ6 is set in a range from 45 to 70 degrees.

The axially inner straight shoulder lateral groove segment 19 in this example has a substantially constant groove width W7.

Preferably, the groove width W7 is set in a range from 0.2 to 0.4 times the maximum groove width W1 of the shoulder main groove 6. Such axially inner straight shoulder lateral groove segment 19 decreased in the groove width can increase the land ratio in the tread shoulder regions, and dry performance and noise performance of the tire 1 can be improved.

The axially outer straight shoulder lateral groove segment 21 in this example has an axially outer end opened at the tread edge Te.

It is preferable that the axially outer straight shoulder lateral groove segment 21 is inclined in the same direction as the axially inner straight shoulder lateral groove segment 19 at a seventh angle θ7 with respect to the tire circumferential direction.

Preferably, the seventh angle θ7 is set in a range from 65 to 90 degrees.

It is preferable that the seventh angle θ7 is greater than the sixth angle θ6 of the axially inner straight shoulder lateral groove segment 19.

Preferably, the difference (θ7−θ6) of the seventh angle θ7 from the sixth angle θ6 is 10 to 30 degrees.

The axially outer straight shoulder lateral groove segment 21 in this example has a substantially constant groove width greater than the groove width W7 of the axially inner straight shoulder lateral groove segment 19.

It is preferable that the maximum groove width W8 of each of the shoulder lateral grooves 17 is the groove width of the axially outer straight shoulder lateral groove segment 21. The maximum groove width W8 is preferably set in a range from 0.2 to 0.6 times, more preferably, 0.3 to 0.5 times the maximum groove width W1 of the shoulder main groove 6. Such shoulder lateral grooves 17 are decreased in the groove width to increase the land ratio in the tread shoulder regions, and dry performance and noise performance of the tire 1 can be improved. Further, as the shoulder lateral grooves 17 and the shoulder main grooves 6 are disposed in the tread portion 2 in good balance, ride comfort performance of the tire 1 can be improved.

The in-between crank shoulder lateral groove segment 20 comprises
a crank shoulder lateral groove segment inner portion 20B connected to the axially inner straight shoulder lateral groove segment 19, and
a crank shoulder lateral groove segment outer portion 20c connected to the axially outer straight shoulder lateral groove segment 21,
which are connected by the acute angled portion 20A.

It is preferable that the crank shoulder lateral groove segment inner portion 20B is continued in the tire axial direction to the axially outer straight shoulder lateral groove segment 21 partially of the groove width, in other words, the groove width of the crank shoulder lateral groove segment inner portion 20B at the axially outer end is partially overlapped in the direction perpendicular to the widthwise direction with the groove width of the axially outer straight shoulder lateral groove segment 21 at the axially inner end.

The shoulder lateral groove 17 having such in-between crank shoulder lateral groove segment 20 facilitates water flow and air flow in the tire axial direction, and wet performance and noise performance of the tire 1 can be improved.

It is preferable that the eighth angle θ8 of the crank shoulder lateral groove segment inner portion 20B with respect to the tire circumferential direction is greater than the sixth angle θ6 of the axially inner straight shoulder lateral groove segment 19.

Preferably, the eighth angle θ8 is set in a range from 75 to 95 degrees.

Preferably, the difference (θ8−θ6) of the eighth angle θ8 from the sixth angle θ6 is 20 to 40 degrees.

The angle formed between the crank shoulder lateral groove segment inner portion 20B and the crank shoulder lateral groove segment outer portion 20C, that is, a ninth angle θ9 which is the angle of the acute angled portion 20A is preferably set in a range from 65 to 85 degrees.

Such acute angled portion 20A has a destabilizing effect on noise sound transmission, and improves the noise performance of the tire 1.

The shoulder lug grooves 18 in this example extend substantially parallel with the axially outer straight shoulder lateral groove segments 21.

Preferably, the groove width W9 of the shoulder lug groove 18 is set in a range from 0.2 to 0.5 times the maximum groove width W8 of the shoulder lateral groove 17.

Such shoulder lug grooves 18 improve the drainage performance while optimizing the rigidity in the tread shoulder regions, and wet performance and ride comfort performance of the tire 1 can be improved.

The tread portion 2 in the present embodiment is provided with narrow grooves 22 extending in the tire circumferential direction.

As shown in FIG. 1 and FIG. 4, each of the narrow grooves 22 extends from the in-between crank shoulder lateral groove segment 20 of one of the shoulder lateral grooves 17 to the axially inner straight shoulder lateral groove segment 19 of the circumferentially adjacent shoulder lateral groove 17. Such narrow grooves 22 can optimize the rigidity in the tread shoulder regions, and ride comfort performance of the tire 1 can be improved.

The narrow groove 22 in this example is disposed in line with the crank shoulder lateral groove segment outer portion 20C of the above-said one of the shoulder lateral grooves 17, and preferably continued from the crank shoulder lateral groove segment outer portion 20c with a substantially same groove width.

It is preferable that the narrow groove 22 is inclined in the same direction as the first oblique crown main groove segments 14 at a tenth angle θ10 with respect to the tire circumferential direction.

Preferably, the tenth angle θ10 is preferably set in a range from 5 to 25 degrees.

The narrow grooves 22 in this example have a substantially constant groove width W10.

Preferably, the groove width W10 is set in a range from 0.1 to 0.3 times the maximum groove width W1 of the shoulder main groove 6.

It is preferable that the groove width W10 is less than the groove width W7 of the axially inner straight shoulder lateral groove segment 19.

The narrow grooves 22 having such dimension can optimize the rigidity in the tread shoulder regions.

In the present embodiment, as shown in FIG. 1, the above-said blocks 5 include shoulder blocks 23 disposed axially outside each of the shoulder main grooves 6, and crown blocks 24 disposed between the shoulder main grooves 6.

The above-said shoulder blocks 23 include
first shoulder blocks 25 adjacent to the above-said each of the shoulder main grooves 6, and
second shoulder blocks 26 disposed axially outside the respective first shoulder block 25.

Each of the first shoulder blocks 25 is defined by the shoulder main groove 6, the narrow groove 22 and two circumferentially adjacent shoulder lateral grooves 17.

It is preferable that each of the first shoulder blocks 25 is provided with first shoulder sipes 29 whose respective one ends are respectively connected with the shoulder main groove 6, the narrow groove 22 and the shoulder lateral groove 17, and whose respective other ends are terminated within the first shoulder block 25. Such first shoulder sipes 29 can optimize the rigidity of the first shoulder block 25, and ride comfort performance of the tire 1 can be improved. Further, by the edge effect of the first shoulder sipes 29, snow performance of the tire 1 can be improved.

Each of the second shoulder blocks 26 is defined by two circumferentially adjacent shoulder lateral grooves 17, the narrow groove 22 and the tread edge Te.

It is preferable that each of the second shoulder blocks 26 is provided with a second shoulder sipe 30 extending from the narrow groove 22 to the shoulder lug groove 18.

The second shoulder sipe 30 is disposed in line with the first shoulder sipe 29 connected to the narrow groove 22.

Such second shoulder sipe 30 can optimize the rigidity of the second shoulder block 26, and ride comfort performance of the tire 1 can be improved. Further, by the edge effect of the second shoulder sipes 30, snow performance of the tire 1 can be improved.

The crown blocks 24 in the present embodiment include first crown blocks 27 and second crown blocks 28 divided by the zigzag crown main groove 7.

It is preferable that each of the first crown blocks 27 and the second crown blocks 28 is provided with crown sipes 31 each having both ends terminated within the block without being connected with the main grooves 3.

Such crown sipes 31 can optimize the rigidity of the first crown block 27 and the second crown block 28, and ride comfort performance of the tire 1 can be improved.

Further, by the edge effect of the crown sipes 31, snow performance of the tire 1 can be improved.

In the above described embodiment, the groove width of each of the shoulder lateral grooves 17 is substantially constant. However, the groove width may be variable.

While detailed description has been made of an especially preferable embodiment of the present invention, the present invention can be embodied in various forms without being limited to the illustrated embodiment.

Comparison Tests

Based on the tread pattern shown in FIG. 1, pneumatic tires of size 275/65R18 (rim size 18×8.0J) were experimentally manufactured as test tires including Comparative ties Ref. 1 and Ref. 2 and Embodiment tires Ex. 1, Ex. 2 and Ex. 3. The test tires had the same specifications except for the specifications shown in Table 1.

Using a pickup truck mounted on all wheels with test tires inflated to 230 kPa as a test car, with two passengers, the test tires were tested for the dry performance, wet performance, mud performance, snow performance, ride comfort performance and noise performance as follows.

<Dry Performance>

During running on a dry surfaced road surface of a test course, grip performance was evaluated by the test driver. The results are indicated in Table 1 by an index based on Ref. 1 being 100, wherein the larger the value, the better the performance.

<Wet Performance>

During running on a wet surfaced road surface of the test course, grip performance was evaluated by the test driver. The results are indicated in Table 1 by an index based on Ref. 1 being 100, wherein the larger the value, the better the performance.

<Mud Performance>

During running on muddy soft ground of a test course, traction performance was evaluated by the test driver. The results are indicated in Table 1 by an index based on Ref. 1 being 100, wherein the larger the value, the better the performance.

<Snow Performance>

During running on a compacted snow road surface of a test course, grip performance was evaluated by the test driver. The results are indicated in Table 1 by an index based on Ref. 1 being 100, wherein the larger the value, the better the performance.

<Ride Comfort Performance>

During running on the dry surfaced road surface of the test course, ride comfort performance was evaluated by the test driver and the fellow passenger. The results are indicated in Table 1 by an index based on Ref. 1 being 100, wherein the larger the value, the better the performance.

<Noise Performance>

The test car was coasted at a speed of 53 km/h in a straight test course, and the maximum sound level was measured with a microphone set at 1.2 meter height from the road surface and 7.5 meter sideways from the running center line. As the test results, reciprocals of the measured maximum sound levels are indicated in Table 1 by an index based on Ref. 1 being 100, wherein the larger the value, the better the performance.

TABLE 1

| Tire | Ref. 1 | Ref. 2 | Ex. 1 | Ex. 2 | Ex. 3 |
|---|---|---|---|---|---|
| shoulder main groove | | | | | |
| maximum groove width W1/tread width Wt (%) | 6 | 12 | 9 | 10 | 7 |
| minimum groove width W2/tread width Wt (%) | 4 | 9 | 7 | 8 | 5 |
| zigzag amplitude L1/tread width Wt (%) | 4 | 4 | 8 | 8 | 8 |
| crown main groove | | | | | |
| zigzag amplitude L2/tread width Wt (%) | 25 | 25 | 20 | 20 | 20 |
| short groove | | | | | |
| maximum groove width W5/groove width W3 (times) | 0 | 1 | 1 | 1 | 1 |
| maximum length L3/groove width W3 (times) | 0 | 1.3 | 1.3 | 1.3 | 1.3 |
| shoulder lateral grooves | | | | | |
| maximum groove width W8/maximum groove width W1 (times) | 0.8 | 0.1 | 0.3 | 0.2 | 0.6 |
| dry performance | 100 | 100 | 102 | 101 | 101 |
| wet performance | 100 | 99 | 100 | 100 | 100 |
| mud performance | 100 | 100 | 101 | 100 | 101 |
| snow performance | 100 | 100 | 102 | 101 | 102 |
| ride comfort performance | 100 | 99 | 102 | 100 | 103 |
| noise performance | 100 | 101 | 103 | 104 | 102 |

It was confirmed from the test results that, in the Embodiment tires, all of the performance were improved in a well congruous manner in comparison with comparative tires.

REFERENCE SIGNS LIST 2 tread portion
3 main groove
4 lateral grooves
6 shoulder main groove
17 shoulder lateral grooves

The invention claimed is:

1. A pneumatic tire comprising:
a tread portion having tread edges and provided with a plurality of main grooves extending zigzag continuously in the tire circumferential direction, and a plurality of lateral grooves extending in the tire axial direction,
the main grooves including a pair of shoulder main grooves disposed one on each side of the tire equator and having a maximum groove width,
the lateral grooves including a plurality of shoulder lateral grooves extending axially outwardly from the shoulder main grooves to the tread edges and having a maximum groove width, wherein
the maximum groove width of the shoulder lateral grooves is 0.2 to 0.6 times the maximum groove width of the shoulder main grooves, and
each of the shoulder lateral grooves is composed of an axially inner straight shoulder lateral groove segment, an axially outer straight shoulder lateral groove segment, and an in-between shoulder lateral groove segment connecting therebetween and the in-between shoulder lateral groove segment is bent in a V-shape having an acute angled portion.

2. The pneumatic tire according to claim 1, wherein
the main grooves include a single crown main groove disposed between the shoulder main grooves, and
a zigzag amplitude in the tire axial direction of the crown main groove is greater than a zigzag amplitude in the tire axial direction of each of the shoulder main grooves.

3. The pneumatic tire according to claim 2, wherein
zigzag pitches in the tire circumferential direction of the crown main groove are equal to zigzag pitches in the tire circumferential direction of each of the shoulder main grooves.

4. The pneumatic tire according to claim 2, wherein
axially outermost points of the crown main groove on both sides in the tire axial direction are respectively connected with axially innermost points of the shoulder main grooves.

5. The pneumatic tire according to claim 2, wherein
the crown main groove is composed of alternate first crown main groove oblique segments and second crown main groove oblique segments, wherein, toward one tire circumferential direction, the first crown main groove oblique segments are inclined with respect to the tire circumferential direction to one tire axial direction, whereas the second crown main groove oblique segments are inclined with respect to the tire circumferential direction to the other tire axial direction, and
a groove width of the first crown main groove oblique segments and a groove width of the second crown main groove oblique segments are less than the minimum groove width of the shoulder main grooves, wherein
the crown main groove has first outermost parts located at axially outermost positions on one side of the tire equator, and second outermost parts located at axially outermost positions on the other side of the tire equator,
the first oblique crown main groove segments and the second oblique crown main groove segments connect between the first outermost parts and the second outermost parts, and
the first outermost parts are connected with the one of the shoulder main grooves, and the second outermost parts are connected with the other of the shoulder main grooves.

6. The pneumatic tire according to claim 1, wherein
the axially inner straight shoulder lateral groove segment is inclined to the same direction as the second oblique crown main groove segments at an angle $\theta 6$ with respect to the tire circumferential direction, and
the axially outer straight shoulder lateral groove segment is inclined to the same direction as the axially inner straight shoulder lateral groove segment at an angle $\theta 7$ with respect to the tire circumferential direction which is greater than the angle $\theta 6$.

7. The pneumatic tire according to claim 6, wherein the difference ($\theta 7-\theta 6$) of the angle $\theta 7$ from the angle $\theta 6$ is in a range from 10 to 30 degrees, the angle $\theta 6$ is in a range from 45 to 70 degrees, and the angle $\theta 7$ is in a range from 65 to 90 degrees.

8. The pneumatic tire according to claim 7, wherein
the in-between shoulder lateral groove segment comprises an inner portion connected to the axially inner straight shoulder lateral groove segment, and an outer portion connected to the axially outer straight shoulder lateral groove segment,
the inner portion is inclined in the same direction as the axially outer straight shoulder lateral groove segment, and
the outer portion is inclined at an acute angle with respect to the inner portion.

9. The pneumatic tire according to claim 8, wherein
the axially inner straight shoulder lateral groove segment has a substantially constant groove width W7, and
the axially outer straight shoulder lateral groove segment has a substantially constant groove width W8 greater than the groove width W7.

10. The pneumatic tire according to claim 9, wherein the tread portion is further provided with narrow grooves each extending straight from the axially inner straight shoulder lateral groove segment of one of the shoulder lateral grooves to the outer portion of the in-between shoulder lateral groove segment of the adjacent shoulder lateral groove so that the outer portion and the narrow groove extend in line.

11. The pneumatic tire according to claim 2, wherein each of the shoulder main grooves is composed of axially outer shoulder main groove segments parallel with the tire circumferential direction, axially inner shoulder main groove segments parallel with the tire circumferential direction, first oblique shoulder main groove segments, and second oblique shoulder main groove segments,
the axially outer shoulder main groove segments and the axially inner shoulder main groove segments are arranged alternately in the tire circumferential direction,
the first oblique shoulder main groove segments are inclined with respect to the tire circumferential direction to one tire axial direction at an angle $\theta 1$, and connect between the axially outer shoulder main groove segments and the axially inner shoulder main groove segments,
the second oblique shoulder main groove segments are inclined with respect to the tire circumferential direction to the other tire axial direction at an angle $\theta 2$, and connect between the axially outer shoulder main groove segments and the axially inner shoulder main groove segments,
the axially inner shoulder main groove segments are respectively connected to axially outermost points of the crown main groove on both sides in the tire axial direction, and the axially outer shoulder main groove segments are respectively connected to the shoulder lateral grooves.

12. The pneumatic tire according to claim 11, wherein each of the shoulder lateral grooves is composed of an axially inner straight shoulder lateral groove segment, an axially outer straight shoulder lateral groove segment, and an in-between shoulder lateral groove segment connecting therebetween and the in-between shoulder lateral groove segment is bent in a V-shape having an acute angled portion.

13. The pneumatic tire according to claim 12, wherein the tread portion is further provided with narrow grooves each extending obliquely from the in-between shoulder lateral groove segment of one of the shoulder lateral grooves to the axially inner straight shoulder lateral groove segment of the adjacent shoulder lateral groove.

14. A pneumatic tire comprising:
a tread portion having tread edges and provided with a plurality of main grooves extending zigzag continuously in the tire circumferential direction, and a plurality of lateral grooves extending in the tire axial direction,
the main grooves including a pair of shoulder main grooves disposed one on each side of the tire equator and having a maximum groove width,
the lateral grooves including a plurality of shoulder lateral grooves extending axially outwardly from the shoulder main grooves to the tread edges and having a maximum groove width, wherein
the maximum groove width of the shoulder lateral grooves is 0.2 to 0.6 times the maximum groove width of the shoulder main grooves, wherein
the main grooves include a single crown main groove disposed between the shoulder main grooves, and
a zigzag amplitude in the tire axial direction of the crown main groove is greater than a zigzag amplitude in the tire axial direction of each of the shoulder main grooves, wherein
the crown main groove is composed of alternate first crown main groove oblique segments and second crown main groove oblique segments, wherein, toward one tire circumferential direction, the first crown main groove oblique segments are inclined with respect to the tire circumferential direction to one tire axial direction, whereas the second crown main groove oblique segments are inclined with respect to the tire circumferential direction to the other tire axial direction, and
each of the first crown main groove oblique segments is connected with a pair of short grooves extending axially outwardly toward the respective shoulder main grooves and terminating without reaching the shoulder main grooves.

15. The pneumatic tire according to claim 14, wherein the short grooves are inclined in the same direction as the second crown main groove oblique segments.

16. The pneumatic tire according to claim 14, wherein
a maximum groove width of each of the short grooves is 0.6 to 1.4 times the groove width of the first crown main groove oblique segment, and a maximum length of each of the short groove is 0.8 to 2.0 times the groove width of the first crown main groove oblique segment.

17. The pneumatic tire according to claim 14, wherein
the crown main groove has first outermost parts located at axially outermost positions on one side of the tire equator, and second outermost parts located at axially outermost positions on the other side of the tire equator,
the first oblique crown main groove segments and the second oblique crown main groove segments connect between the first outermost parts and the second outermost parts, and
the first outermost parts are connected with one of the shoulder main grooves, and the second outermost parts are connected with the other of the shoulder main grooves.

18. A pneumatic tire comprising:
a tread portion having tread edges and provided with a plurality of main grooves extending zigzag continuously in the tire circumferential direction, and a plurality of lateral grooves extending in the tire axial direction,
the main grooves including a pair of shoulder main grooves disposed one on each side of the tire equator and having a maximum groove width,
the lateral grooves including a plurality of shoulder lateral grooves extending axially outwardly from the shoulder main grooves to the tread edges and having a maximum groove width,
wherein
the maximum groove width of the shoulder lateral grooves is 0.2 to 0.6 times the maximum groove width of the shoulder main grooves,
each of the shoulder lateral grooves is composed of an axially inner straight shoulder lateral groove segment, an axially outer straight shoulder lateral groove segment, and an in-between crank shoulder lateral groove segment connecting therebetween,
the in-between shoulder lateral groove segment is bent in a V-shape having an acute angled portion, and
the tread portion is further provided with narrow grooves each extending obliquely with respect to the tire circumferential direction from the in-between shoulder lateral groove segment of one of the shoulder lateral grooves to the axially inner straight shoulder lateral groove segment of the adjacent shoulder lateral groove.

19. The pneumatic tire according to claim 18, wherein
the crown main groove has first outermost parts located at axially outermost positions on one side of the tire equator, and second outermost parts located at axially outermost positions on the other side of the tire equator,
the first oblique crown main groove segments and the second oblique crown main groove segments connect between the first outermost parts and the second outermost parts, and
the first outermost parts are connected with one of the shoulder main grooves, and the second outermost parts are connected with the other of the shoulder main grooves.

* * * * *